F. S. CHAPMAN.
LIGHTNING ARRESTER.
APPLICATION FILED JUNE 21, 1915.
Reissued July 27, 1915.
13,950.
Fig. 1.
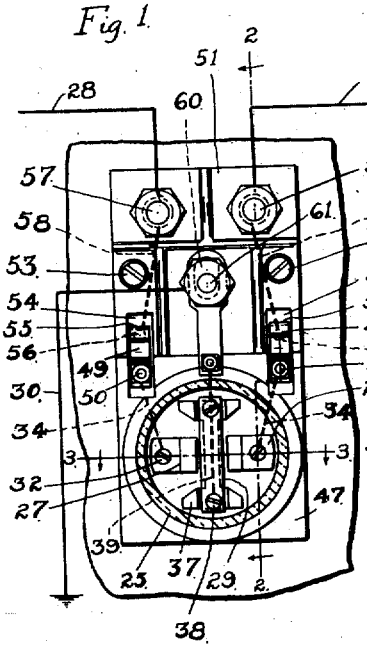
Fig. 2.
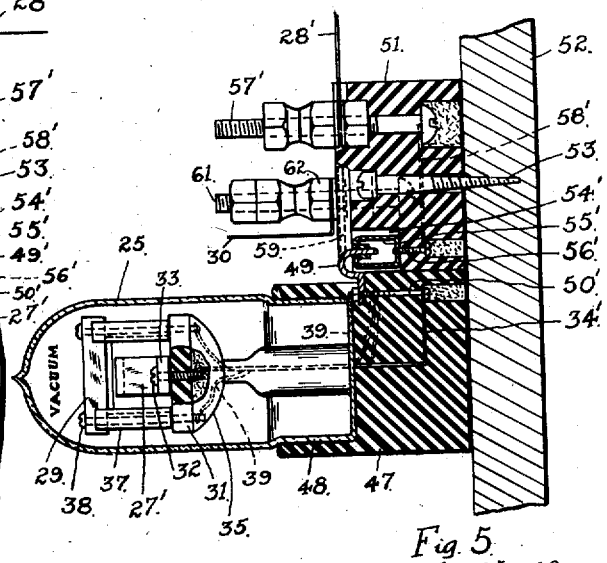
Fig. 3.
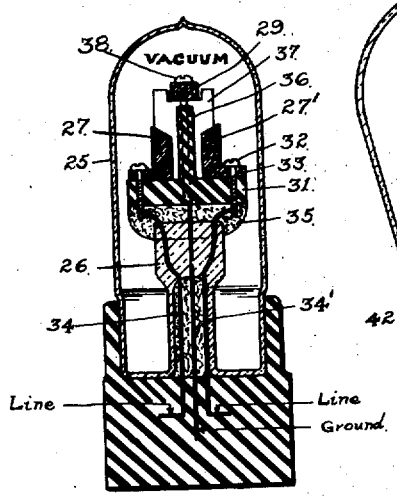
Fig. 4.
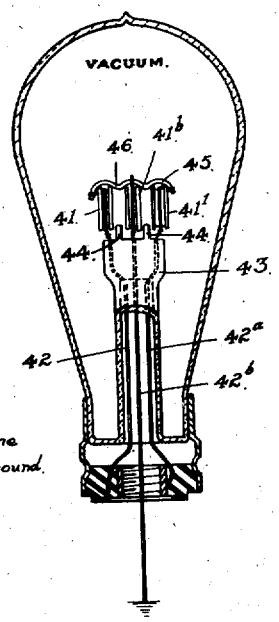
Fig. 5.
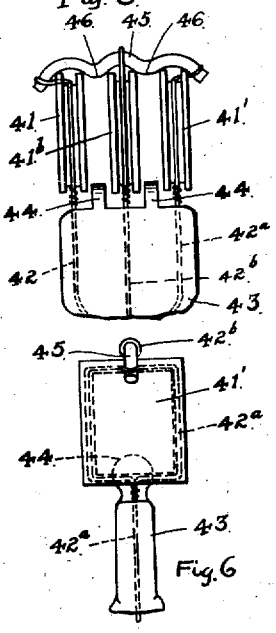
Fig. 6
INVENTOR.
BY Frank S. Chapman
Barnett & Truman
ATTORNEYS.

UNITED STATES PATENT OFFICE.

FRANK SPENCER CHAPMAN, OF GREENSBURG, INDIANA, ASSIGNOR TO THE NATIONAL ELECTRIC SPECIALTY COMPANY, OF TOLEDO, OHIO, A CORPORATION OF OHIO.

LIGHTNING-ARRESTER.

13,950. Specification of Reissued Letters Patent. Reissued July 27, 1915.

Original No. 1,104,960, dated July 28, 1914, Serial No. 738,430. Application for reissue filed June 21, 1915. Serial No. 35,456.

*To all whom it may concern:*

Be it known that I, FRANK SPENCER CHAPMAN, a citizen of the United States, and a resident of Greensburg, in the county of Decatur and State of Indiana, have made certain new and useful Improvements in Lightning-Arresters of which the following is a specification.

My invention relates to lightning arresters.

One of primary objects of the invention is to provide in a vacuum lightning arrester, that is, an arrester in which the electrodes are confined in an evacuated vessel, certain improved means for firmly and reliably fixing the electrodes in place in the vessel so that they will be accurately and permanently spaced the required distance apart. Considerable difficulty has been experienced, in the manufacture of devices of this sort, in devising means for supporting the electrodes, which are ordinarily quite heavy in comparison with the leading-in wires, that will withstand the rough handling incident to shipment and the vibrations to which the devices are often subjected in use.

The invention has for further objects such other new improvements, arrangements, constructions and devices relating to lightning arresters as will be hereinafter more fully described and claimed.

The invention is illustrated in the accompanying drawings, wherein—

Figure 1 shows an elevation of one form of lightning arrester embodying certain of the improvements of my invention; Fig. 2, a sectional view taken on line 2—2 of Fig. 1, looking in the direction of the arrows; Fig. 3, a similar view taken on line 3—3 of Fig. 1; Fig. 4, a longitudinal view of a lightning arrester utilizing a different means from that shown in the preceding figures for mounting the electrodes; Fig. 5, a detail view showing in elevation and on a larger scale the devices employed for mounting and properly spacing the electrodes one from another in the lightning arrester shown in Fig. 4; Fig. 6, a side view of the devices shown in Fig. 5.

Like characters of reference designate like parts in the several figures of the drawings.

Referring first to Figs. 1 to 3 inclusive, 25 designates an evacuated or partially evacuated vessel, preferably of glass and formed preferably with an inwardly projecting stem 26. This type of arrester is intended particularly to protect an instrument on a metallic circuit and hence is provided with two electrodes 27, 27′ connected, respectively, with the line wires 28, 28′ and an electrode 29 which is connected with the ground wire 30. The electrodes 27, 27′ are preferably L-shaped in longitudinal section and are secured to a supporting disk 31, of some refractory non-conducting material, such as porcelain, by means of screws 32 which pass through the horizontal lugs 33 of the electrodes and through the disk 31. The leading-in wires 34, 34′, which are sealed through the stem 26, are attached to the screws 32. The supporting member 31 is sustained on these wires preferably with the aid of a body 35 of some non-conducting, plastic material such as asbestos cement. Projecting upward from the supporting member 31, and preferably integrally formed therewith, is a shield 36 which intervenes between the electrodes 27, 27′. The opposite ends 37 of the shield project above its middle portion and support in a horizontal position the grounded electrode 29. The electrodes preferably consist of bodies of carbon. The grounded electrode 29 is preferably held in place by screws 38 which pass down through the supporting disk 31 and are connected with a leading-in wire 39, also sealed through the stem 26. By this arrangement the electrodes may be accurately spaced one from another so as to provide spark gaps of the required dimensions. The mounting is very secure and reliable, so that there is no danger that the electrodes will be displaced, either in shipment or if used in railroad switch work and subjected to the vibrations incident thereto. Furthermore, the shield 36 checks a direct discharge between the electrodes 27, 27′ without interfering with the discharge from either of the electrodes to the ground. This is desirable under certain circumstances. This shield, however, does not prevent the discharge between one line electrode and the grounded electrode from ionizing the gap between the other line electrode and the ground, as a space intervenes between the shield and the grounded electrode. It is desirable that the discharge from one line should ionize the other gap so as to reduce its resistance. It sometimes happens that when one end of the line receives a static charge of sufficient potential to go through the arrester, the line on the other side of the instrument will receive a charge heavy enough to do damage to the instrument but insufficient to overcome the resistance of the gap in the arrester.

In Figs. 4 to 6 inclusive, another device is employed for firmly and securely mounting the electrodes. The container in this case is shown as consisting of a glass bulb 40 similar to the ordinary incandescent electric light bulb. This arrester has three electrodes, although this number might be increased or decreased. 41, 41′ designate the two line wire electrodes between which is arranged the grounded electrode $41^b$. These electrodes consist preferably of carbon plates rabbeted on their edges, as shown, and supported on the leading-in wires 42, $42^a$, $42^b$ which are sealed through the inwardly projecting stem 43 of the container and looped around the rabbeted edges of their respective electrodes. The top of the stem is preferably formed with lugs 44 which intervene between adjacent electrodes so as to keep them from being displaced at the bottom. At the top of the electrodes a non-conducting bond is provided consisting preferably of a short glass rod 45 formed with bends 46 intervening between the outer electrodes and the middle one, the leading-in wires being preferably looped around the binding device as shown in the drawings so as to hold the same in place.

In Figs. 1 to 3 inclusive, I have shown certain preferred arrangements and devices for mounting lightning arresters upon a switchboard or signal box or other structure. Other arrangements than these might be employed for accomplishing this purpose. The arrester, for example the device shown in Figs. 1 to 3 inclusive, is mounted in any suitable manner on a porcelain base 47, for example, is fitted into a circular recess 48 in one side of the base. Secured to the base 47, which will be referred to hereafter as the removable base or base member, are U-shaped clips 49, 49′ which project over the edge of the base and are secured thereto by screws 50, 50′ to which the leading-in wires 34, 34′ are connected. The removable base member 47 is adapted to be attached to a porcelain base member 51 which is permanently secured to the switchboard 52 or other supporting structure, for example by means of the screws 53. The fixed base member 51 is provided, within recesses 54, 54′, with spring jacks 55, 55′ consisting of strips of metal bent into U-shape, with their extremities inturned which are secured to the base member 51 by screws 56, 56′. The fixed base member 51 is further provided with binding posts 57, 57′ connected by wires 58, 58′ with the screws 56, 56′. The line wires 28, 28′ run to these binding posts.

Secured to the removable base 47 and connected with the leading-in wire 39 from the grounded electrode 26 is a strip of metal 59, formed with an opening 60 adapting it for connection with a binding post 61, on the fixed base 51, with which is connected the ground line 30. The connecting strip 59 is secured to the binding post 61 by a nut 62. It will be seen that by these arrangements the lightning arrester can be removed from its mounting, if necessary, for replacement or repair, very conveniently and expeditiously, without disturbing the ground and line connections. The connecting piece 59 prevents the removable base member carrying the arrester from being shaken loose from the fixed base member because of vibration or other causes.

While I have described my invention in certain preferred embodiments, it will be understood that modifications might be made without departure from the invention.

The arrangement, in a lightning arrester of the vacuum type, of electrodes on a base supported upon and transversely to the leading-in wires at a distance from the glass walls of the evacuated vessel is described and claimed in my prior filed application Serial No. 562,416, and is therefore not claimed herein.

I claim:

1. A vacuum lightning arrester comprising an evacuated vessel, three electrodes therein, a supporting element within the vessel to which the electrodes are secured and which provides a barrier intervening between two of said electrodes.

2. A vacuum lightning arrester comprising an evacuated vessel, three electrodes therein, a supporting disk to which two of said elements are secured, and a barrier on said disk intervening between said electrodes and supporting the third electrode.

3. A vacuum lightning arrester comprising an evacuated vessel, three electrodes therein, a supporting disk to which two of said electrodes are secured, a barrier between said electrodes which is higher at the ends than in the middle, and means for securing the third electrode to the projecting ends of the barrier so that a space intervenes between said electrode and the middle portion of the barrier.

4. A vacuum lightning arrester comprising an evacuated glass vessel, leading-in wires sealed through the wall of said vessel and projecting into the space within the vessel, electrodes electrically connected with the leading-in wires respectively, and supporting means for the electrodes of non-conducting, refractory material which wholly incloses and protects the leading-in wires and holds said electrodes in proper spaced relation one to another.

5. A vacuum lightning arrester comprising an evacuated glass vessel having an inturned stem, a base of refractory non-conducting material, one or more electrodes mounted on said base, one or more leading-in wires sealed through said stem and secured to the under side of said base and electrically connected with said electrode or electrodes, and a body of non-combustible cement interposed between said stem and base.

6. A vacuum lightning arrester comprising an evacuated vessel, three electrodes therein, a supporting element within said vessel to which said electrodes are secured and which provides a barrier intervening between two of said electrodes, the third electrode being arranged at one end of said barrier.

7. A vacuum lightning arrester comprising an evacuated vessel, three electrodes in said vessel and a barrier arranged to intervene between two of said electrodes, the third electrode being arranged at the end of said barrier.

8. A vacuum lightning arrester comprising an evacuated vessel, two line wire electrodes and a grounded electrode therein, a supporting element to which said electrodes are secured which provides a barrier intervening between said line electrodes, said grounded electrode being arranged at one edge of said barrier.

9. A vacuum lightning arrester comprising an evacuated vessel, two line wire electrodes and a grounded electrode therein, a supporting base to which said line wire electrodes are secured, and a barrier on said base intervening between said line wire electrodes and supporting at one edge thereof said grounded electrode.

10. A vacuum lightning arrester comprising an evacuated glass vessel having an inturned stem, a base arranged at right angles to said stem, a barrier on said base, line wire electrodes secured to the base at opposite sides of said barrier, a grounded electrode secured to the edge of said barrier, leading-in wires sealed through said stem and attached to the under side of said base and electrically connected with said electrodes respectively, and a body of non-combustible cement intervening between said stem and said base.

FRANK SPENCER CHAPMAN.

Witnesses:
ADA KENDALL,
E. EMMETT TUNE.